United States Patent [19]

Arnaud

[11] 4,118,594
[45] Oct. 3, 1978

[54] LONG DISTANCE COAXIAL CABLE WITH OPTICAL FIBRES

[75] Inventor: Maurice Arnaud, Paris, France

[73] Assignee: Societe Lignes Telegraphiques et Telephoniques, Paris, France

[21] Appl. No.: 754,609

[22] Filed: Dec. 27, 1976

[30] Foreign Application Priority Data

Dec. 30, 1975 [FR] France .................................. 75 40056

[51] Int. Cl.² .............................................. G02B 5/14
[52] U.S. Cl. ...................................... 350/96.23; 174/27
[58] Field of Search ........................ 174/27, 28, 70 R; 350/96 B; 310/214

[56] References Cited

U.S. PATENT DOCUMENTS

| 354,892 | 12/1886 | Dubois | 174/27 |
| 1,891,200 | 12/1932 | Eaton | 310/214 |
| 2,640,956 | 6/1953 | Buchanan | 310/214 |
| 4,037,923 | 7/1977 | Beal | 350/96 B |

FOREIGN PATENT DOCUMENTS

| 2,312,788 | 12/1976 | France | 350/96.23 |
| 2,216,652 | 2/1973 | France | 350/96.23 |
| 2,266,266 | 10/1975 | France | 350/96.23 |

*Primary Examiner*—J. V. Truhe
*Assistant Examiner*—J. H. Bouchard
*Attorney, Agent, or Firm*—Solon B. Kemon; William T. Estabrook

[57] ABSTRACT

A cable comprising a disc insulated coaxial structure in which said discs are designed with notches in which are located optical fibres extending parallel with the inner conductor of the coaxial structure. An insulating keeper wire is forced into the notch to prevent the free fibres escaping therefrom. One or several fibres are contained within each notch.

6 Claims, 4 Drawing Figures

LONG DISTANCE COAXIAL CABLE WITH OPTICAL FIBRES

BACKGROUND OF THE INVENTION

The invention relates to the field of telecommunications and more particularly to cables serving for establishing long distance connections.

The increasing demand for new telephone lines involves a ceaseless widening of the spectrum of frequencies used for transmission. For example, the frequency band transmitted in analog systems using conventional coaxial cables attains at the present day 60 MHz and new higher frequency analog and digital transmission systems are under study among which mention may be made of the optical transmission systems employing optical fibres. The techniques employed and the associated equipment cover a large scope. Nevertheless, since cable laying is costly and complex, it is cost saving to foresee even at this time the establishment of wide band connections within the optical spectrum. The present invention relates essentially to a coaxial cable of the type currently utilized for long distance liaisons, including the elements necessary for transmission in wide band systems at optical frequencies, without these elements in any way disturbing the characteristics of coaxial transmission or the operations necessary for laying and splicing of the coaxial trunk.

The present invention relates to a long distance transmission cable compatible with present-day equipment, due to electrical transmission of the "conventional" coaxial type, capable furthermore of transmitting a wide band in the optical domain.

The cable according to the invention has the following advantages:
- the increase of the bandwith obtained by the optical fibres may be considerable without, however, interfering with the transmission of the coaxial type; thus, it is possible to carry on installation of present-day equipment with a quarantee that the latter will not subsequently be affected;
- the external dimensions of the cable, its impedance and its attenuation remain practically unchanged;
- the relatively thick external conductor of the present-day coaxial cable protects the optical fibres against stresses of external origin during all the steps of the cable manufacture and also during transport thereof and laying in place thereof. Consequently, the increase in unit attenuation of the fibres subsequent to the cable manufacture is minimal;
- introduction of the optical fibres into the present-day coaxial cable is a supplementary step introduced into a manufacturing process without affecting conventional machines and, consequently, it limits the investment necessary for the manufacture of the novel cable.

PRIOR ART

French Specification No. 2,266,266 filed on the Mar. 19, 1975 by SIEMENS discloses a mixed cable comprising electrical conductors (twins or quads) and optical conductors. This subscriber connecting cable cannot be employed for long distance transmission.

SUMMARY OF THE INVENTION

The cable for simultaneous transmission of electrical waves and light waves according to the invention, comprising a coaxial having insulating spacers, is characterized in that the said spacers are formed with notches in which optical fibres are distributed.

BRIEF DESCRIPTION OF THE DRAWINGS

Further features and advantages of the cable according to the invention will become apparent from the description accompanying FIGS. 1 to 4, which said Figures are given purely by way of non-limitative examples and in which.

DETAILED DESCRIPTION OF THE INVENTION

Figure 1:
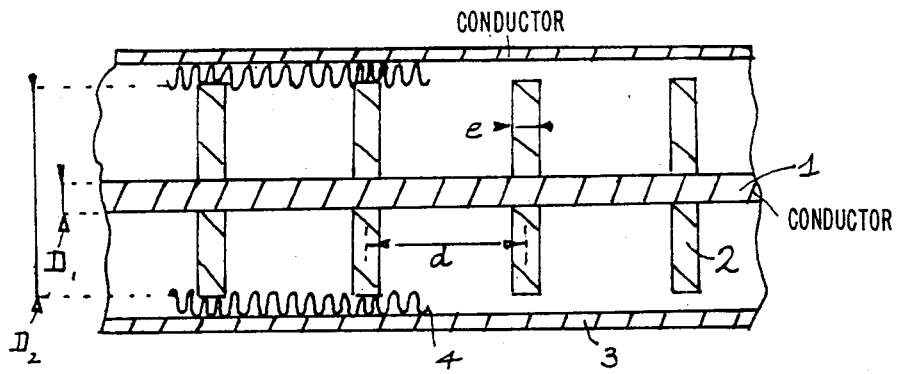
FIG. 1 shows the longitudinal section through a coaxial cable according to the prior art, manufactured by the present Assignee.

FIG. 1 shows a longitudinal section through a cable according to the prior art as described in French Patent No. 2,216,652 filed on the Feb. 1, 1973 and assigned to the present Assignee.

In such a cable, a copper inner conductor 1 of diameter $D_1$ is supported by spacers 2 made from plastics material and the relative permittivity $\epsilon_1$ of which is close to unity, the spacing between the said spacers being $d$. These spacers of thickness $e$ have an external diameter $D_2$. They bear on a thin plastics sheet 4 which is undulated along transverse circles, and which is maintained in position by the external conductor 3 of the coaxial cable. The external conductor 3 is an aluminum sheet formed into a cylinder and which is closed by a continuous longitudinal weld of the longitudinal edge which renders it fluid-tight.

Figure 2:
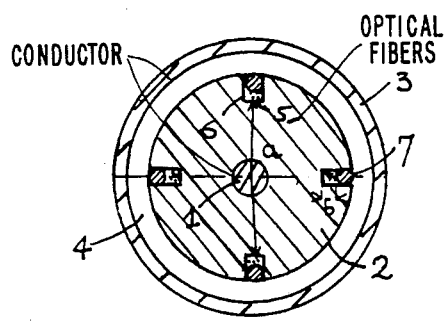
FIGS. 2 and 3 each show a section through a cable according to the invention taken in the plane of an insulating spacer.

FIG. 2 shows a section through the cable according to the invention, effected at the level of a spacer. The latter is formed with notches 6 limited at the peripheral portion. FIG. 2 shows, by way of non-limitative example, a regular arrangement having four notches (or slots). The optical fibres 5 are disposed in random arrangement in the slots 6 and are locked by a keeper wire 7 made from plastics material. The said keeper wire may be employed over a length identical with that of the optical fibres themselves or, optionally, in the form of sections of reduced length. This stuffing wire has for example the thickness of the spacers. Its diameter is about the width of the notch. Within the scope of the invention, there is preferably employed a drawn keeper wire made from high density polyethylene, introduced as a force fit into the slots.

Designating $\epsilon_2$ the relative permittivity of the material constituting the optical fibres and $\epsilon_3$ the equivalent permittivity of the space between two spacers when the cable comprises optical fibres, expression of the mean relative permittivity $\bar{\epsilon}$ of the cable without optical fibres may be written as follows:

$$\bar{\epsilon} = \frac{\epsilon_1 e + (d - e)}{d}$$

and the expression of the mean permittivity $\epsilon_F$ of the cable comprising optical fibres $$\overline{\epsilon}_F = \frac{\epsilon_1 e + \epsilon_3 (d - e)}{d}$$

Furthermore, the permittivity $\epsilon_3$ of the space between two spacers may be calculated from the permittivity $\epsilon_4$ of a cable the periphery of which is totally occupied by optical fibres.

Designating the neperian logarithms by Log, $$\epsilon_4 = \frac{\epsilon_2 \operatorname{Log}(D_2/D_1)}{[\epsilon_2 \operatorname{Log}(D_1 + 2a)/D_1] + [\operatorname{Log} D_2/(D_1 + 2a)]}$$

Designating $a$ the diameter corresponding to the bottom of the notches or slots and $b$ the thickness occupied by the optical fibres in the notches, $l$ the width of the slots and $n$ the number thereof, the ring fraction occupied by the optical fibres is $$\frac{nl}{\pi(D_1 + 2a + b)}$$

and the relative permittivity sought $$\epsilon_3 = 1 + (\epsilon_4 - 1) \frac{nl}{\pi(D_1 + 2a + b)}$$

This expression, which is written in literal form $$\epsilon_3 = 1 - \frac{nl}{\pi(D_1 + 2a + b)} + \frac{nl}{\pi(D_1 + 2a + b)} \frac{\epsilon_2 \operatorname{Log}(D_2/D_1)}{[\epsilon_2 \operatorname{Log}(D_1 + 2a)/D_1] + [\operatorname{Log} D_2/(D_1 + 2a)]}$$

shows that:

1. when $nl/\pi(D_1 + 2a + b)$ is small, $\epsilon_3$ is also very close to unity;

2. when the number of optical fibres has increased in proportion such that $nl/\pi(D_1 + 2a + b)$ is no longer very small, the increase of $\epsilon_3$ is slow since it results from the difference of the two terms containing factor $nl/\pi(D_1 + 2a + b)$, whereof the second is a logarithm ratio varying slowly with the number of optical fibres introduced. Furthermore, it is always possible to maintain $\overline{\epsilon}_F$ equal to $\overline{\epsilon}$ by diminishing the thickness of the spacers of quantity $$\Delta e = (d - e)(\epsilon_3 - 1)/(\epsilon_3 - \epsilon_1)$$

or furthermore by increasing the distance $d$ by quantity $$\Delta d = \frac{d(d - e)(\epsilon_3 - 1)}{e(\epsilon_1 - 1) - d(\epsilon_3 - 1)}$$

or alternatively by replacing the $\epsilon_1$ permittivity dielectric by a $\epsilon_5$ permittivity dielectric such that $$\epsilon_5 - \epsilon_1 = \frac{(d - e)(1 - \epsilon_3)}{e}$$

Figure 3:
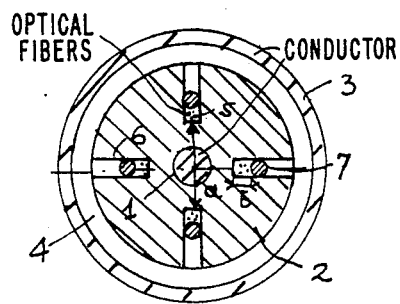

FIG. 3 shows a variant of the cable wherein the slots 6 are formed deeper in such manner that the optical fibres 5 are disposed between the conductors 1 and 3. A calculation similar to the preceding one gives as expression of permittivity $\epsilon_4'$ of the space between two spacers supposing the optical fibres completely occupy the ring between the conductors of the coaxial $$\epsilon'_4 = \frac{\epsilon_2 \operatorname{Log}(D_2/D_1)}{Q}$$

$$Q = \epsilon_2 \operatorname{Log}[(D_1 + 2a)/D_1]\} + \{\operatorname{Log}[(D_1 + 2a + 2b)/(D_1 + 2a)]\} + \{\epsilon_2 \operatorname{Log}[(D_2/D_1 + 2a + 2b)]\}$$

In a manner similar to that already discussed, the permittivity of the space between two spacers partially (only within the slots) occupied by the optical fibres is $$\epsilon'_3 = 1 + \frac{nl}{\pi(D_1 + 2a + b)}(\epsilon'_4 - 1)$$

The value of $\epsilon_4'$ is only very slightly different from $\epsilon_4$ and the same remarks already made with regard to $\epsilon_3$ apply to $\epsilon_4'$; this is also true of the remarks concerning the correction of thickness $\Delta e$ to be effected in order to compensate for the permittivity variation due to the optical fibres addition, and also that concerning the distance $d$, etc.

Figure 4:
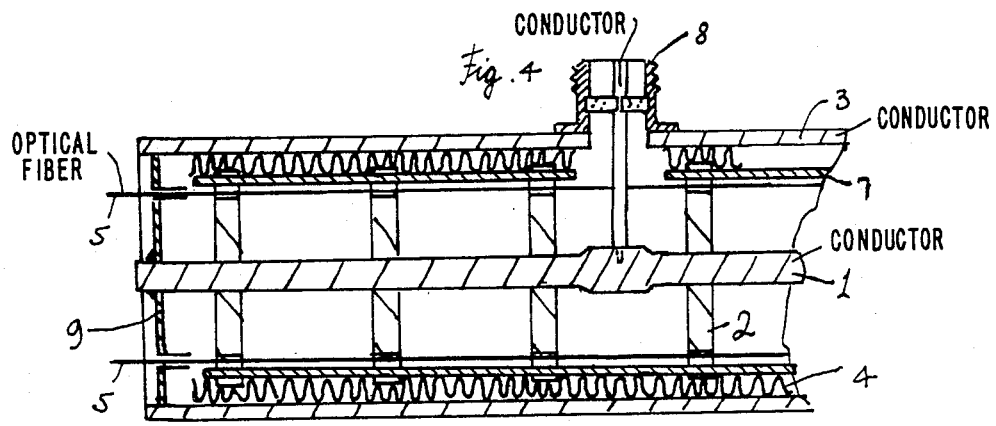
FIG. 4 shows a longitudinal section through an end of the cable according to the invention.

FIG. 4 shows a cable end according to the invention, provided with a coaxial stub or mount 8 perpendicular to the cable the central conductor of which is associated with the central conductor of the cable and longitudinal outlets for the optical fibres through a metal short circuiting plane 9 for the high frequency waves. The apertures for passage of the fibres in the metal short-circuiting plane may be considered to be circular wave guides of a length equal to the thickness of the plate. Due to the fibre dimensions, their diameter is always very much smaller than the minimum diameter to transmit the coaxial liaison upper frequencies without attenuation; they operate as guides beyond the cut-off at these frequencies that is as reactive impedances. Their length may be adjusted to permit wide band matching of the coaxial-coaxial transition since the distance between the coaxial stub or plate 8 and the short-circuiting plane 9 is sufficiently small with respect to the wavelength at the coaxial liaison frequencies.

By way of illustration, there has been produced a section of the such cable having the following dimensions which correspond to a standard approved coaxial cable known as coaxial pair 3.7/13.5

$D_1 = 3.7$ mm
$D_2 = 13.5$ mm
$e = 2.3$ mm
$l = 0.3$ mm
$b = 1.2$ mm
$d = 33$ mm

This cable comprises four optical fibres 150 micrometres in diameter and the relative permittivity $\epsilon_2$ of which is 2.2.

These four fibres are locked in four slots by means of four polyethylene keeper wires the diameter of which is equal to 0.6 mm.

The value $\epsilon_4$ calculated is equal to 1.09 and the equivalent permittivity of a space between two spacers $\epsilon_3$ is equal to 1.003.

The measurement of the characteristic impedance up to 400 MHz has indicated no or change therein.

A comparison of the r.f. losses of two sections having the same length, one of which is provided with optical fibres and the other free of fibres shows no measurable increase in attenuation per unit length.

On the other hand, measurements of attenuation on a free unitary optical fibre and on a fibre within the coaxial structure show a deviation lower than 1 dB/Km between these two measurements.

What we claim:

1. A disc insulated coaxial cable for wideband long distance communication comprising:
   an inner conductor;
   disc shaped spacers on said conductor;
   an outer transversally corrugated dielectric ribbon wrapped around said discs;
   an outer conductor surrounding said dielectric ribbon;
   means defining notches in the periphery of said discs;
   optical fibers disposed in said notches paralleling said inner conductor; and
   keeper means retaining said fibers in said notches.

2. A disc insulated coaxial cable for wideband long distance communication according to claim 1 wherein:

$$\frac{nl}{\pi[D_1 + 2a + b]}$$

is negligible
where:
   N is the number of notches within a disc,
   $e$ is the length of said notch,
   $D_1$ is the diameter of the inner conductor,
   $a$ is the distance to the cable axis of the innermost fiber,
   $b$ is the distance to the cable axis of outermost fiber.

3. A disc insulated coaxial cable according to claim 1 in which the thickness of the discs is reduced by $\Delta e$ with respect to the thickness $e$ of the discs in the same bandwidth coaxial cable without optical fibers in which:

$$\Delta e = \frac{(d-e)(\epsilon_3 - 1)}{\epsilon_3 - \epsilon_1}$$

where:
   $d$ is the pitch of the discs,
   $e$ is the thickness of the discs,
   $\epsilon_3$ is the permittivity of the space within the cable between two discs,
   $\epsilon_1$ is the permittivity of the discs.

4. A disc insulated coaxial cable according to claim 1 in which the pitch of the discs is modified by $\Delta d$ with respect to the pitch of the same bandwidth coaxial cable without optical fibers in which:

$$\Delta d = \frac{d(d-e)(\epsilon_3 - 1)}{e(\epsilon_1 - 1) - d(\epsilon_3 - 1)}$$

where:
   $d$ is the pitch of the discs,
   $e$ is the thickness of the discs,
   $\epsilon_3$ is the permittivity of the space within the cable between two discs,
   $\epsilon_1$ is the permittivity of the discs.

5. A disc insulated coaxial cable according to claim 1 in which the permittivity of the discs is $\epsilon_5$ and $$\epsilon_5 - \epsilon_1 = \frac{(d-e)(1-\epsilon_3)}{e}$$

where:
   $\epsilon_1$ is the permittivity of the discs in the same bandwidth coaxial without optical fibers,
   $d$ is the pitch of the discs,
   $e$ is the thickness of the discs,
   $\epsilon_3$ is the permittivity of the space within the cable between two discs,
   $\epsilon_1$ is the permittivity of the discs.

6. A disc insulated coaxial cable according to claim 1 including a transverse coaxial stub connected therewith, the inner conductor of said stub being in contact with the inner conductor of the cable and terminated by a short circuiting conductive plate contacting both the inner and the outer conductors provided with insulated holes to let the optical fibers through the thickness of said plate such that said holes are waveguides operating beyond the cut-off frequency at the upper frequencies in the operating frequency band and constitute a matching impedance for said stub.

* * * * *